United States Patent Office 3,376,350
Patented Apr. 2, 1968

3,376,350
CHLORINATED PHENYL ETHER
Richard Y. Wen, Midland, Mich., assignor to The Dow
Chemical Company, Midland, Mich., a corporation of
Delaware
No Drawing. Filed Sept. 9, 1965, Ser. No. 486,199
1 Claim. (Cl. 260—612)

This invention relates to a new chemical compound, specifically, bis($\alpha,\alpha,\alpha$-trichloro-p-tolyl) ether which has the formula

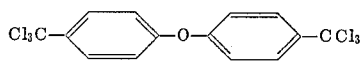

This new compound is a valuable intermediate which is easily converted by conventional hydrolysis or alcoholysis to the corresponding oxydibenzoic acid or ester thereof. The present invention, therefore, provides a new and convenient means for making p,p'-oxydibenzoic acid and its esters. Oxydibenzoic acid particularly in the form of its lower alkyl ester, is a useful monomer for the preparation of resinous polyesters, polyamides, and the like. Bis($\alpha,\alpha,\alpha$-trichloro-p-tolyl) ether is also an active fungistat which protects plants against mildew and like diseases when sprayed or dusted on their foliage according to conventional practice.

This compound can be prepared by chlorination of p-tolyl ether under conditions favoring side chain chlorination, i.e., in the presence of actinic radiation or a peroxide. A particularly convenient procedure utilizes as the starting material bis($\alpha$-chloro-p-tolyl) ether which is easily available from the chloromethylation of phenyl ether. This mode of preparation is illustrated by the example which follows.

EXAMPLE

A reaction flask containing a solution of 10 g. of bis-($\alpha$-chloro-p-tolyl) ether in 60 ml. of carbon tetrachloride was irradiated and heated by a 275 watt sunlamp. When the solution reached its reflux temperature (77° C.), gaseous chlorine was inttroduced through a sparger tube at 8–10 ml. per minute and the reaction was continued under these conditions until about the theoretical four mole equivalents of chlorine had been reacted. The reaction solution was distilled under reduced pressure to remove the solvent and the residue was crystallized from petroleum ether to obtain 11.5 grams of white crystalline bis-($\alpha,\alpha,\alpha$-trichloro-p-tolyl) ether, M.P. 87–89° C. The structure of the product was confirmed as that of the named compound by infrared examination and elemental analysis. Alkaline hydrolysis of the product yielded the expected p,p'-oxydibenzoic acid.

I claim:
1. Bis($\alpha,\alpha,\alpha$-trichloro-p-tolyl) ether.

References Cited
UNITED STATES PATENTS

| 2,547,679 | 4/1951 | Wolfe | 260—612 |
| 2,911,380 | 11/1959 | Doedens | 260—612 X |

FOREIGN PATENTS 870,561  3/1953  Germany.

BERNARD HELFIN, *Primary Examiner.*